Jan. 1, 1963  G. CHURLEY  3,071,473
METHOD OF THAWING AND COOKING FROZEN VEGETABLES
Filed Aug. 12, 1957
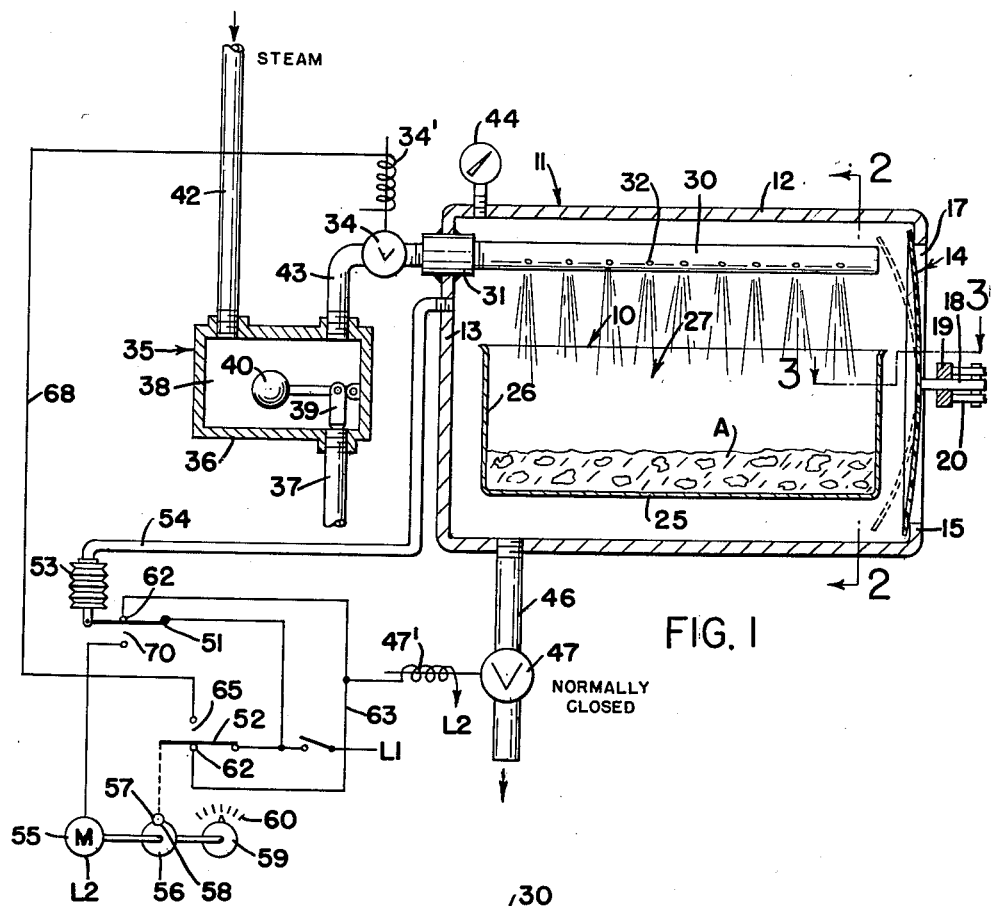
FIG. 1
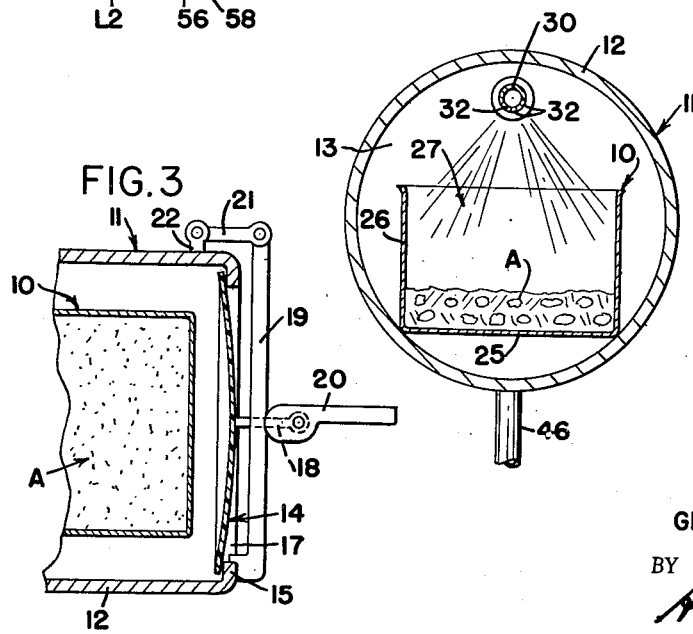
FIG. 3
FIG. 2
INVENTOR.
GEORGE CHURLEY
BY Alfred C Body
ATTORNEY

United States Patent Office 3,071,473
Patented Jan. 1, 1963

3,071,473
METHOD OF THAWING AND COOKING FROZEN VEGETABLES
George Churley, Willoughby, Ohio, assignor to The Stouffer Corporation, a corporation of Ohio
Filed Aug. 12, 1957, Ser. No. 677,432
2 Claims. (Cl. 99—100)

This invention pertains to the art of cooking, and more particularly to a high speed cooker using externally supplied steam as the source of heat.

The invention is particularly applicable to the high speed cooking of frozen vegetables for service in restaurants and the like, and will be described with particular reference thereto although it will be appreciated that the invention has broader applications.

In the art of cooking for restaurants, the quality of the cooking is probably the most important item to a continuing customer acceptance and repeat business. Such quality cooking requires that the food be thoroughly cooked, but never overcooked.

Next to quality, speed of cooking becomes most important. Thus, as the speed of cooking is increased, the same equipment and the same space can serve more and more people with the resultant savings in the cost of the food to the customer and increased profits to the proprietor.

In the cooking of vegetables, it is known to employ steam under pressure as the source of heat. Such steam under pressure cooks the vegetables at greatly increased speeds over boiling water, but as will appear, unless the steam is properly applied, very fast cooking speeds still cannot be obtained. This problem is particularly apparent with the frozen vegetables now conventionally employed in restaurants. As attempts were made to increase the cooking speed using steam, the problem of overcooking part of the vegetables of a batch and undercooking others has become serious. Thus, in some instances it was found that some of the vegetables in the cooker were either completely or even overcooked while otherst were either still frozen or completely raw.

The present invention contemplates new and improved methods of cooking and apparatus for cooking of a general type referred to which overcomes all of the above-referred to difficulties and enables cooking speeds faster than anything heretofore possible while still ensuring that the entire batch of food will be cooked to substantially the same degree of thoroughness.

In accordance with the present invention, the food to be cooked is placed in an open top container positioned inside of a closed pressure vessel, and steam under pressure is projected in jets directly onto the top of the food in the container and is allowed to project onto such food until it is thoroughly cooked.

By following what would appear at first glance to be such a simple expedient, it has been possible to decrease the cooking time for frozen vegetables by almost 50% from anything heretofore known in the restaurant cooking business, and at the same time the problems of over and undercooking of the vegetables are entirely eliminated.

The above may be distinguished from prior practices wherein steam was simply allowed to project into the pressure vessel in a manner such that no direct jet of steam directly contacted the upper surface of the food in the container.

The food may be placed in perforated or imperforated open topped containers, but in accordance with a more limited aspect of the invention, an imperforated open topped container is employed and the steam, just before being projected onto the top of the food, is passed through a water and a dirt trap whereby only dry clean steam reaches the food.

By using an imperforate container, the natural juices of the food is retained in contact with the food making it unnecessary for the chef to add liquids to the cooked food after it has been cooked as would be necessary with a perforated container. The use of the water and dirt trap prevents these juices from being diluted by the slug of water normally present in a steam pressure line having only an occasional steam flow such as would be present in lines leading to steam pressure cookers. Furthermore, such condensate has a tendency to have suspended therein small particles of dirt which, particularly in an imperforate container, would remain on the vegetables and make them unpalatable.

The principal object of the invention is the provision of a new and improved method and apparatus for the cooking of foods in restaurants and the like which permits of extremely high cooking speeds.

Another object of the invention is the provision of a new and improved method and apparatus wherein all of the food can be rapidly cooked without the dangers of over and undercooking.

Another object of the invention is the provision of a new and improved method and apparatus for the cooking of frozen vegetables wherein the juices of the cooked vegetables remain with the vegetables without dilution from steam line condensate or from contamination from the steam line dirt.

Still another object of the invention is the provision of a new and improved method of high speed cooking of frozen vegetables and the like which can be completely automatic.

Still another object of the invention is provision of a new and improved method and apparatus for the cooking of vegetables for restaurants and the like which enables a single cooking unit to handle a maximum number of servings in a given period of time.

The invention may take physical form in certain parts and arrangements of parts, a preferred embodiment of which will be described in detail in this specification and illustrated in the accompanying drawing which is a part hereof and wherein, FIGURE 1 is a side cross-sectional view partly schematic of a steam pressure cooker illustrating a preferred embodiment of the invention;

FIGURE 2 is a cross-sectional view of FIGURE 1 taken approximately on the line 2—2 thereof; and, FIGURE 3 is a fragmentary cross-sectional view of FIGURE 1 taken approximately on the line 3—3 thereof.

Referring now to the drawings wherein the showings are for the purposes of illustrating a preferred embodiment of the invention only, and not for the purposes of limiting same, the figures shows a quantity of food A to be cooked resting in an open-topped container 10 and positioned on the inside of a closed pressure vessel 11.

The pressure vessel may take any desired form, but in the preferred embodiment is generally in the shape of a cylinder having cylindrical side walls 12 closed at one end by an end 13 and at the opposite end by a door 14 cooperating with an inwardly extending flange 15 on the side walls 12. The door 14 is resilient and in the unbiased state is bowed about a horizontal axis as indicated by the dotted lines 16. Its outer vertical diameter, when flexed to this shape, is less than the inner diameter of the flange 15 so that the door by a sideward motion may be moved outwardly through the opening 17.

The door 14 is flexed to the flat position so that its outer edges bear against the inner surfaces of the flange 15 by means of a toggle arrangement comprised of a toggle handle 20 pivotally connected to an operating shaft 18 reciprocally supported in an arm 19 extending across the opening 17 and pivotally supported on a short pivot arm 21 in turn pivotally supported on the outer side of the cylindrical sidewall 12 by a bracket 22. The shaft 18 is connected to the door 14 and operation of the handle 20 tends to move the door from the flexed position shown on dotted lines in FIGURE 1 to the sealing position shown with the door in pressure sealing engagement with the inner edges of the flange 15. The construction is such that once pressure has been built up on the inside of the vessel 11, the door 14 will remain in sealing engagement with the flange 15 even after the toggle arrangement is released.

The food container 10 may have any desired construction, but in the preferred embodiment is formed of stainless steel having a bottom 25 and side walls 26 defining an open topped space 27 in which the food A is positioned. The upper edges of the side walls 26 are preferably spaced slightly from the inner surfaces of the side walls 12 to allow for the passage of steam around the sides of the container 10.

For the purpose of heating the food A in the container 10, a steam ejector pipe 30 extends generally the entire length of the pressure vessel 11 along its vertical midplane high enough so as to provide clearance for insertion and removal of the food container 10. The steam ejector pipe 30 is provided with a plurality of steam ejector passages 32 so formed as to direct jets of steam onto the entire surface of the food A in the container 10. Any number of these jet passages 32 may be employed, but as shown in the preferred embodiment, there are three rows, a center row directed vertically downward and the outer rows directed generally at an angle outwardly and downwardly from the center plane.

Steam is supplied through the steam ejector pipe 30 from a suitable source of steam under pressure (not shown) through a valve 34 and a steam trap 35.

The steam trap 35 is conventional in construction and comprised of a closed container 36 having a drain line 37 which communicates with the interior 38 through a normally closed valve 39 opened by means of a pivotally supported float 40 when sufficient amounts of condensate have collected in the interior 38. Normally such valve 39 will be closed.

The steam from the steam source is blown into the trap 35 from a suitable inlet pipe 42 and leaves the trap 35 through a pipe 43 communicated with the upper parts of the interior 38 which pipe 43 communicates directly with the steam ejector pipe 30 through the valve 34. The valve is preferably located on the vessel side of the trap, although it may be located on either side thereof. It is important that any horizontal portion of the pipe 43 which communicates the trap with the steam ejector pipe 30 have as short a length as possible so that a minimum of condensate can form therein and provision should be made so that any condensate on the pressure side of the valve 34 can drain back into the trap interior 38.

Drainage means are provided for the pressure vessel 11 consisting of a pipe 46 communicating with the interior of the pressure vessel 11 preferably at the lowest point as is shown and a valve 47 controls the flow of air, gas and/or water through this drain pipe 46.

A pressure gage 44 indicates the pressure on the interior of the vessel 11.

In the preferred embodiment, means are provided for automatically opening and closing the valves 34, 47 in the proper sequence and leaving them open or closed for the proper time period so that the cooking operation may progress on a substantially automatic basis.

In the preferred embodiment, the valves 34, 47 are electrically controlled, normally closed solenoid valves of a conventional or known type having operating coils shown schematically at 34', 47', respectively, one terminal of each of which is connected to a common power line L2. The other terminals of the coils 34', 47' are energized through a pair of single pole double throw switches 51, 52.

The switch 51 is a pressure operated switch and has a pressure actuated bellows 53 communicating with the interior of the pressure vessel 11 through a conduit 54. The other switch 52 is actuated by means of a timer of conventional construction including a motor 55 which rotates a cam 56 operatively associated with a cam follower 57. The cam 56 is shown in the off position and the follower 57 is resting in a notch 58 formed in the cam surface. A dial knob 59 in association with a graduated scale 60 rotates the cam 56 and enables the timer to be set for any desired period of operation.

Prior to the beginning of operation of the apparatus disclosed, the coil 47' is energized from the line L1 through the normally closed contacts 62 of switch 51 and switch 61. Thus the valve 47 is open.

When an operator desires to start a cooking operation, the food A, usually loose and frozen, is placed in the container 10. This container is then placed in the pressure vessel 11 and the door 14 closed and brought into sealing engagement with the flange 15 by operation of the handle 20. To start the cooking operation, the operator then sets the dial 59 to the desired time period on the scale 60. This time period may be as desired, but is normally predetermined for each type of food to be placed in the container 10. Actuation of the dial 59 rotates the cam 56 and closes the normally open contact 65 of the switch 52. This operation also opens the normally closed contacts 66 without effect because of the normally closed contacts 62 which are in parallel therewith. Closing of the contacts 65 energizes the coil 34' through wire 68 thus opening valve 34. Steam immediately flows through the trap 35 through the steam ejector pipe 30 and the steam ejector openings 32 into the pressure vessel 11. The jets of steam strike the food A directly where it gives up its heat to the food and is rapidly condensed. The temperature of the food is raised rapidly to the temperature of the steam. As the top layer of the food becomes heated, the jets of steam are no longer condensed by such top layer and penetrate into intermediate layers of the food where it is condensed with the same result. As these intermediate layers are heated to the elevated temperatures, the steam continues to project through the spaces between the particles of food to the lowermost levels and these lowermost levels are raised to the elevated temperatures. It is to be noted that in this operation, the steam jets tend to drive out the air in the spaces beween the food. Such air along with the air in the remainder in the pressure vessel is then carried outwardly through the discharge pipe 46 and the valve 47 which as previously indicated, is open.

As soon as all the food is brought to an elevated temperature and the steam stops condensing thereon at a very rapid rate, the pressure on the interior of the vessel 11 begins to increase. In this respect, it is to be noted that the size of the discharge pipe 46, the opening in the valve 47, or both, form an orifice having an area in relation to the rate of steam supply such that the pressure on the interior of the vessel 11 will not appreciably increase until the rapid rate of steam condensation brought on by the presence of the frozen food particles ceases. Once the food is thawed, the rate of condensation goes down. More steam passes out through the pipe 46. The pressure then rises. As this pressure reaches a predetermined value, normally about 5 pounds, the bellows 53 are expanded to open contacts 62 and close contacts 70 of the switch 51. Opening of the contacts 62 de-energizes the coil 47' and valve 47 closes while valve 34 remains open. The interior of the vessel 11 thus rises to the full steam line pressure which in the preferred embodiment is 15 pounds per square inch. The operator may then release the handle 20. The door 14 remains closed due to this interior pressure.

The food A then continues to cook at a very rapid rate, the steam being in close contact with all the particles. Closing of the normally open contacts 70 energizes the motor 55 of the timer which motor then rotates the cam 56 for the period of time set by the dial knob 59.

As soon as the notch 58 comes opposite to the cam follower 57, the switch 52 opens its contacts 65. This de-energizes coil 34' and valve 34 is closed to stop the flow of steam into the vessel 11. Simultaneously, contacts 66 close to energize coil 47' and the valve 47 is opened and the pressure on the inside of the vessel 11 is reduced to atmospheric pressure. As soon as the pressure reaches atmospheric pressure, the door 14 snaps inwardly and the operator knows that the food A is cooked and ready for serving.

With the above operation, it is to be noted that only dry steam is allowed to enter the vessel 11. By virtue of the steam trap 35 and the very short horizontal length of the pipe 43, practically no condensate enters the vessel 11. Some condensate does form on the food A as the steam strikes it and brings the food to the elevated temperature. This condensate in conjunction with the juices of the food A has been found to be just sufficient for the proper serving of the food.

This is to be distinguished from prior practices wherein the food was cooked in a perforated container. Such food had to be removed from the container, placed in another dish and then liquids had to be added.

Such practice is also to be distinguished from prior experiments using an imperforated container and no steam trap where efforts were made to project the steam directly on top of the food A and the amount of condensate which entered was excessive to the point where the natural juices of the food were unnecessarily diluted.

So far as I am aware, it has never heretofore been possible to successfully project steam directly on to the top of food while it is cooking and still obtain a satisfactory cooked product. On the other hand, the present invention has enabled the provision of a high speed pressure cooker which is extremely rapid and at such rapid rate insures that the food will be fully cooked from top to bottom, but not overcooked at any one point. Furthermore, it enables the retention of all of the natural juices of the food without unnecessary dilution thereof nor contamination.

The invention has been described with reference to a preferred embodiment. Portions of the preferred embodiment have been illustrated schematically, but in sufficient detail to enable one skilled in the art to readily duplicate the apparatus.

Obviously, modifications and alterations will occur to others upon a reading and understanding of this specification and it is my intention to include all such modifications and alterations insofar as they come within the scope of the appended claims.

Having thus described my invention, I claim:

1. A high speed method of thawing and cooking previously frozen vegetables comprising: placing said vegetables in a frozen mass having voids therein, supporting said mass from the bottom and the sides so that the upper surface only is exposed to jets adapted to impinge substantially dry steam directly thereon, projecting substantially dry steam in jets directly onto said upper surface and into said voids until the air in said voids is aspirated and said mass is thawed, thereafter, continuing to project steam in jets onto said upper surface while simultaneously excluding air from said mass and raising the pressure of said steam around said mass to a predetermined value, allowing said pressure to remain for a predetermined time at said predetermined value to cook said mass, stopping said jets of steam and venting said pressure, and collecting the condensate formed on said surface while said vegetables are thawing.

2. A high speed method of thawing and cooking previously frozen vegetables in a closed pressure vessel comprising: placing said frozen vegetables in said vessel with an upper surface of said vegetables exposed to jets adapted to impinge substantially dry steam directly thereon, projecting jets of substantially dry steam directly down onto said upper surface while venting said vessel to atmosphere for exhausting said steam and air in said vessel, and allowing said vegetables to become substantially thawed, thereafter, sealing said vessel, maintaining the pressure in said vessel at a predetermined cooking pressure for a predetermined time to cook said vegetables, and, then, venting said vessel and removing said vegetables from said vessel.

References Cited in the file of this patent

UNITED STATES PATENTS

| | | |
|---|---|---|
| 1,677,912 | Bartleson | July 24, 1928 |
| 1,702,854 | Simonds | Feb. 19, 1929 |
| 2,270,327 | Mills et al. | Jan. 20, 1942 |
| 2,339,974 | Austin | Jan. 25, 1944 |
| 2,368,141 | Johnson | Jan. 30, 1945 |
| 2,515,137 | Schall et al. | July 11, 1950 |